United States Patent Office 2,843,628
Patented July 15, 1958

2,843,628
FUMARIC ACID ISOMERIZATION

John B. Rust, Verona, N. J., assignor, by direct and mesne assignments, of one-half to Montclair Research Corporation, Montclair, N. J., a corporation of New Jersey, and one-half to Ellis-Foster Company, a corporation of New Jersey No Drawing. Application June 23, 1953
Serial No. 363,668

24 Claims. (Cl. 260—537)

The present invention relates to fumaric acid, new methods for its production and particularly to new methods of its production from liquors containing maleic acid.

The invention relates more particularly to the production of fumaric acid from waste liquors resulting from the production of phthalic anhydride and maleic anhydride from naphthalene and benzene respectively and the like.

In the process of producing phthalic anhydride, the scrub liquor contains maleic acid as well as other organic compounds. In the process of producing maleic anhydride from the oxidation of benzene and other organic compounds, maleic acid is also present in the scrub liquor along with small quantities of the other organic compounds. Such scrub liquors arise as by washing the product with water, or in the separation of the product from aqueous media, or in scrubbing industrial gases. In many cases these scrub liquors are discarded as of no value due to the difficulty of isolating from them any economical proportions of maleic acid. Furthermore, disposal of these scrub liquors presents a serious problem due to their toxicity and resultant stream pollution. In general such waste liquors contain from 10% to 40% maleic acid as well as organic impurities in the form of organic oxidation products such as acids, aldehydes, quinones, ketones and the like and condensation and polymerization products.

It is known that sulfur, certain sulfur-containing organic compounds, thiocyanates, halogens, mineral acids and the like are useful in causing the isomerization of maleic acid to fumaric acid. Most of these compounds, however, must be used in relatively large amount, or are so corrosive as to require special equipment for handling them, or require such stringent reaction conditions as to be impractical for working with maleic acid in aqueous solution.

Among the objects of the present invention is included isomerization of maleic acid by a new class of isomerization agents having high activity and capable of use in relatively minor amounts.

Other objects include such use of isomerization agents that yield products of light color.

Still further objects and advantages of the present invention will appear from the more detailed description set forth below, it being understood that such more detailed description is given by way of illustration and explanation only, and not by way of limitation since various changes therein may be made by those skilled in the art without departing from the scope and spirit of the present invention.

In accordance with the present invention, isomerization of maletic acid is carried out in aqueous media by the utilization of an isomerizing agent including a formamidine disulfide having the formula.

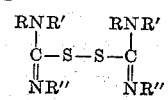

where R, R' and R" may be the same or different substituents from hydrogen and monovalent groups including alkyl, aryl, cycloalkyl, alkaryl, heterocyclic and the like, and their non-functional substituted groups. Desirably these formamidine disulfides are used in the form of their salts such as the dihydrochloride, sulfate, phosphate, trichloracetate, and the like. The salt form is the most stable form and as such the materials may be isolated and utilized in the process of the present invention. Their isolation, however, is unnecessary and they may be utilized in the form of a solution containing the formamidine disulfide salts. These formamidine disulfides as isomerizing agents are claimed where the liquors are pretreated with sulphur dioxide, in the companion application filed concurrently herewith Serial No. 363,669, filed June 23, 1953, entitled "Recovery of Fumaric Acid," to which reference is hereby made. Example of specific formamidine disulfides that may be used are formamidine disulfide dihydrochloride, N-phenyl formamidine disulfide dihydrochloride, ethylene formamidine disulfide dihydrochloride, diethyl formamidine disulfide dihydrochloride, allyl formamidine disulfide dihydrochloride, etc.

These formamidine disulfides, their substitution products and derivatives, are particularly effective catalysts for the transformation of maleic acid into fumaric acid in aqueous solution. These compounds, in general, are strong bases, readily forming salts with strong mineral and organic acids such as hydrochloric acid, sulfuric acid, phosphoric acid and the like. They are powerful catalysts for the maleic to fumaric isomerization and as a consequence may be used in relatively minor amounts thus effecting substantial economic savings in the isomerization process. They, also, have relatively no tendency to form colored complexes with metallic ions as do the thiocyanates and consequently yield fumaric acid of pale color that needs no further purification or at least only minor purification to be commercially usable.

Although, the process of the present invention is particularly adaptable to the production of fumaric acid by isomerizing the maleic acid from the waste liquors described above, it is also eminently suitable for use with aqueous solutions containing substantially pure maleic acid.

The isomerization may be carried out simultaneously in the presence of a chemically inert decolorizing agent such as activated carbon, to give a pale colored product or the maleic liquor may be subjected to an initial or pretreatment with such decolorizing agent followed by isomerization.

The isomerization may be carried out in the presence of a sulfur dioxide agent used simultaneously with the formamidine disulfide, its salt derivative or substitution product. By use of such sulfur dioxide agent, the amount of isomerization agent may be materially reduced resulting in a considerable saving in processing cost. Furthermore, the process of the present invention in utilizing sulfur dioxide or sulfur dioxide yielding compounds yields substantially paler colored liquors which result in substantially lighter color fumaric acid after isomerization. This light-colored fumaric acid is obtained, furthermore, after only one activated carbon treatment instead of two or more which is normally needed in prior art processes.

In addition to sulfur dioxide introduced or generated in situ in the liquor, sulfites and bisulfites may be employed. These are included under the term sulfur dioxide agent. Desirably water soluble agents are used, particularly those which do not give any interfering action such as insoluble precipitates with maleic or the acid e. g. mineral acid used. Mixtures of sulfur dioxide with the salts or mixtures of the salts may be employed. Acids used to generate sulfur dioxide in situ include particularly mineral acids such as sulfuric, hydrochloric, nitric, phosphoric acids and the like. By using such combinations of sulfite and bisulfite salts with mineral acids, the ultimate effect is the introduction of $SO_2$ in situ since $SO_2$ is easily liberated from sulfite or bisulfite salts by means of mineral acids.

The amount of sulfur dioxide, or sulfur dioxide yielding compounds depends to a great extent upon the nature and concentration of the impurities in the maleic liquor and is best determined by an experimental trial utilizing about 2% of thiourea based upon the maleic content of the liquors for ascertaining the effect of the conversion of maleic into fumaric acid. By trying varying quantities of the sulfur dioxide agent, and applying the 2% thiourea isomerization test, the optimum amounts of agent for any given liquor is readily determined.

The isomerization reaction is desirably carried out at any desired temperature e. g. below the boiling point of water under the conditions of use and may for example be at room temperature or at elevated temperatures of for example 60° to 90° C. The pretreatment with activated carbon when used, may desirably be at elevated temperatures for example from 60 to 100° C.

It will be seen that a variety of formamidine disulfides may be used as isomerizing agents. The carbon atoms content in the substituent groups may vary. For most uses, such carbon atom content will generally not exceed about ten.

As indicated in the examples, in general, the proportions of the reactants or other components, temperatures, etc. do not materially affect the operation or the yields obtained except the amount of the isomerization catalyst in connection with which the amount of catalyst has a very substantial effect on the yield obtained.

While maleic acid is particularly referred to, maleic anhydride may also be effectively isomerized in accordance with this invention. The term pro-maleic component may be used to cover both maleic acid or maleic anhydride or any maleic material thus subject to isomerization by the methods set forth herein.

The following examples illustrate the invention, parts being by weight unless otherwise indicated.

Example 1

One liter of a waste maleic scrub liquor having a dark reddish-brown color and analyzing 15% of maleic acid was mixed with 20 gms. of activated carbon and boiled for about 1 hour. The solution was filtered hot to give an orange-yellow filtrate which was divided into two 500 cc. portions. To one portion (A) there was added 3 gms. of formamidine disulfide dihydrochloride and the solution cooled to room temperature and allowed to stand for 24 hours. The fumaric acid was filtered off, washed with a little cold water and dried. A 70 gm. yield of pale colored fumaric acid was obtained representing a conversion of 93.5%. To another portion (B), there was added 3 gms. of formamidine disulfide dihydrochloride and 3 gms. of sodium bisulfite and the solution cooled to room temperature and allowed to stand for 24 hours. The fumaric acid was filtered off, washed with a little cold water and dried. A 73 gm. yield of very light-colored fumaric acid was obtained representing a conversion of 97.5%.

Example 2

Two liters of maleic scrub liquor described in Example 1 were mixed with 50 gms. of activated carbon and 7 gms. of sodium sulfite and heated to 90° C. with stirring for 45 minutes. The solution was filtered hot and divided into two one liter portions. To one portion (A), there was added 10 gms. of formamidine disulfide dihydrochloride (representing 7.5 gms. of free base) and 15 gms. of sodium bisulfite. The solution was cooled to room temperature and allowed to stand for 48 hours. Twenty cubic centimeters of 37% HCl were added and the fumaric acid filtered off, washed with a little cold water and dried. The yield of light-colored fumaric acid was 150 gms. representing a 100% conversion.

To another portion (B) there was added 2.5 gms. of formamidine disulfide dihydrochloride (representing 1.7 gms. of the free base) and 3.75 gms. of sodium bisulfite. The solution was cooled to room temperature and allowed to stand for 48 hours. Twenty cubic centimeters of 37% HCl were added and the fumaric acid filtered off, washed with a little cold water and dried. The yield of light-colored fumaric acid was 122 gms. representing an 84.7% conversion.

Example 3

Two liters of the maleic scrub liquor as described in Example 1 were mixed with 40 gms. of activated carbon and heated to 90° C. for 45 minutes with stirring. The solution was filtered hot to give a yellow-orange filtrate. The filtrate was divided into four 500 cc. portions and treated as follows at 70° C.: (a) 2.86 gms. of N-phenyl formamidine disulfide dihydrochloride added, the solution cooled and allowed to stand for 48 hours; (b) 3.75 gms. of ethylene formamidine disulfide dihydrochloride

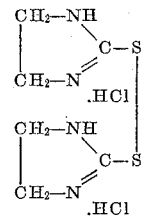

added and the solution cooled and allowed to stand for 48 hours; (c) 3.6 gms. of diethyl formamidine disulfide dihydrochloride

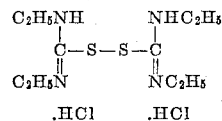

added, the solution cooled and allowed to stand for 48 hours; (d) 3.75 gms. of formamidine disulfide dihydrochloride added, the solution cooled and allowed to stand for 48 hours.

In each case, the precipitated fumaric acid was filtered, washed with a little water and dried.

Light-colored fumaric acids were secured in each case which was of acceptable commercial grade.

Example 4

2 liters of a waste maleic scrub liquor having a dark reddish-brown color and analyzing 15% of maleic acid was mixed with 50 gms. of activated carbon and boiled for about 1 hour. The solution was filtered hot to give an orange filtrate which was divided into four 500 cc. portions designated A, B, C, D. To these portions was added:

| | A, g. | B, g. | C, g. | D, g. |
|---|---|---|---|---|
| Formamidine disulphide dihydrochloride | 3.75 | 3.75 | 3.75 | 3.75 |
| Sodium bisulfite | 3.75 | 5.6 | 7.5 | 10 | and allowed to stand overnight. The following day to each portion was added 10 cc. of 37% HCl and the solutions filtered and dried. The yields obtained were:

| A, g. | B, g. | C, g. | D, g. |
|---|---|---|---|
| 69 | 67 | 65 | 65 |

It may be seen that the varying proportions of sodium bisulfite used has little effect on the isomerization.

Example 5

To each of four 1-liter beakers containing 500 cc. portions of waste maleic scrub liquor (15%) was added the following materials:

|  | A, g. | B, g. | C, g. | D, g. |
|---|---|---|---|---|
| Activated carbon | 7.5 | 10 | 12.5 | 15 |
| Sodium bisulfite | 1.75 | 1.75 | 1.75 | 1.75 | and decolorized at 90° C. for 30 minutes, then filtered while hot. To each at 65° C. the following materials were added:

|  | A, g. | B, g. | C, g. | D, g. |
|---|---|---|---|---|
| Formamidine disulphide dihydrochloride | 3.75 | 3.75 | 3.75 | 3.75 |
| Sodium bisulfite | 5.6 | 5.6 | 5.6 | 5.6 | and allowed to stand overnight. The following day to each portion was added 10 cc. of 37% HCl and the solutions filtered and dried. The yields obtained were:

| A, g. | B, g. | C, g. | D, g. |
|---|---|---|---|
| 71 | 73 | 73 | 73 |

Since the yields obtained were almost identical it may be seen that the amount of activated carbon had no effect on the isomerization.

Example 6

To each of four 1-liter beakers containing 500 cc. portions of waste maleic scrub liquor (15%) was added the following materials:

|  | A, g. | B, g. | C, g. | D, g. |
|---|---|---|---|---|
| Activated carbon | 12.5 | 12.5 | 12.5 | 12.5 |
| Sodium bisulfite | 1.85 | 1.85 | 1.85 | 1.85 | and decolorized for 30 minutes at the following temperatures:

| A, ° C. | B, ° C. | C, ° C. | D, ° C. |
|---|---|---|---|
| 50–60 | 60–70 | 70–80 | 80–90 | then filtered and the following materials added while maintaining this temperature in the above ranges:

|  | A, g. | B, g. | C, g. | D, g. |
|---|---|---|---|---|
| Formamidine disulphide dihydrochloride | 3.75 | 3.75 | 3.75 | 3.75 |
| Sodium bisulfite | 5.6 | 5.6 | 5.6 | 5.6 |

The solutions were allowed to stand overnight and the following day 10 cc. of 37% HCl were added to each and the solutions filtered and dried. The yields were:

| A, g. | B, g. | C, g. | D, g. |
|---|---|---|---|
| 67 | 67 | 67 | 69 |

From which it will be noted that isomerization is not affected by treating at different temperature ranges.

Example 7

The following is an example using a maleic solution not of waste liquor.

To each of five 1-liter beakers containing 98 g. portions of maleic anhydride the following amounts of water were added:

| A | B | C | D | E |
|---|---|---|---|---|
| 1,062 gs. (10% maleic acid in solution). | 675 gs. (15% maleic acid in soultion). | 482 gs. (20% maleic acid in solution). | 366 gs. (25% maleic acid in solution). | 289 gs. (30% maleic acid in solution). |

Heated to dissolve (about 65° C.) and 6 g. formamidine disulphide and dihydrochloride added to each at 65° C. Allowed to stand overnight and the following day to each portion was added 10 cc. of 37% HCl and the solutions filtered and dried. The yields obtained were:

| A, g. | B, g. | C, g. | D, g. | E, g. |
|---|---|---|---|---|
| 104 | 111 | 104 | 106 | 106 |

It will thus be seen that the pure maleic acid is subject to the same isomerization effect as the waste maleic scrub liquor and the concentration of the solution makes no difference to the results obtained.

Example 8

(a) 500 cc. of waste maleic scrub liquor (15%) was heated to 65° C. in a 1-liter beaker and to this 3.75 g. of formamidine disulphide dihydrochloride added, followed immediately by 5.6 g. of sodium bisulfite. This was allowed to stand overnight and the following day 10 cc. of 37% HCl added and the solution then filtered and dried. The yield obtained was 65 g.

(b) To 500 cc. of waste maleic scrub liquor (15%) was added 1.75 g. of sodium bisulfite and the solution heated to 65° C. 3.75 g. of formamidine disulphide dihydrochloride and 5.6 g. of sodium bisulfite were then added and the solution allowed to stand overnight. The following day 10 cc. of 37% HCl was added and the solution then filtered and dried. The yield obtained was 65 g.

(c) 500 cc. of waste maleic scrub liquor (15%) was heated to 65° C. in a 1-liter beaker and to this was added 3.75 g. of formamidine disulphide dihydrochloride and solution allowed to stand overnight. The following day 10 cc. of 37% HCl was added and the solution filtered and dried. The yield obtained was 64 g.

(d) To 500 cc. of waste maleic scrub liquor (15%) in a 1-liter beaker was added 12.5 g. activated carbon and the solution decolorized at 90° C. for 30 minutes, and then filtered. 3.75 g. of formamidine disulphide dihydrochloride was added to the filtrate at 65° C. The solution was allowed to stand overnight and the following day 10 cc. of 37% HCl added and the sodium filtered and dried. The yield obtained was 58 g.

It will be seen from the above that there is no appreciable difference in the yield when the sodium bisulfite is added either before or after isomerization. However, when sodium bisulfite is not used at all the yield obtained is less for example by about 17%. Furthermore if activated carbon is used for decolorizing in the absence of sodium bisulfite the yield obtained is also less for example by about 10.8%.

Example 9

To four 1-liter beakers each containing 500 cc. portions of waste maleic scrub liquor (15%) were added the following materials:

|  | A, g. | B, g. | C, g. | D, g. |
|---|---|---|---|---|
| Activated carbon | 12.5 | 12.5 | 12.5 | 12.5 |
| Sodium bisulfite | 1.75 | 1.75 | 1.75 | 1.75 | and heated to 90° C. for 30 minutes and filtered while hot. At 65° C. the following were then added:

|  | A, g. | B, g. | C, g. | D, g. |
|---|---|---|---|---|
| Formamidine disulphide dihydrochloride | 0.72 | 1.40 | 2.2 | 2.9 |
| Sodium bisulfite | 1.08 | 2.1 | 3.3 | 4.35 |

The solutions were allowed to stand overnight and the following day to each was added 10 cc. of 37% HCl and the solutions filtered and dried. The yields obtained were:

| A, g. | B, g. | C, g. | D, g. |
|---|---|---|---|
| 32 | 52 | 58 | 65 |

It will be seen that the amount of catalyzer used for the isomerization greatly affects the yield obtained.

Having thus set forth my invention, I claim:

1. The process of converting maleic acid to fumaric acid which comprises heating an aqueous solution containing maleic acid with an isomerization agent including a formamidine disulfide.

2. The process of converting maleic acid to fumaric acid which comprises heating an aqueous solution containing maleic acid with an isomerization agent including a formamidine disulfide salt.

3. The process of claim 1 carried out in the presence of a chemically inert decolorizing agent, the aqueous solution being a colored waste liquor.

4. The process of claim 3 in which the decolorizing agent is activated carbon.

5. The process of claim 2 carried out in the presence of a chemically inert decolorizing agent, the aqueous solution being a colored waste liquor.

6. The process of claim 5 in which the decolorizing agent is activated carbon.

7. The process of claim 1 in which the aqueous solution is a waste liquor containing maleic acid.

8. The process of claim 7 in which the isomerization step is preceded by treatment with activated carbon while heating.

9. The process of claim 7 carried out in the presence of activated carbon.

10. The process of claim 7 carried out in the presence of a sulfur dioxide agent.

11. The process of claim 10 in which the sulfur dioxide agent is a sulfite.

12. The process of claim 11 in which the sulfite is a bisulfite.

13. The process of claim 11 in which a mineral acid is present.

14. The process of claim 2 in which the aqueous solution is a waste liquor containing maleic acid.

15. The process of claim 14 in which the isomerization step is preceded by treatment with activated carbon while heating.

16. The process of claim 14 carried out in the presence of activated carbon.

17. The process of claim 14 carried out in the presence of a sulfur dioxide agent.

18. The process of claim 17 in which the sulfur dioxide agent is a sulfite.

19. The process of claim 18 in which the sulfite is a bisulfite.

20. The process of claim 18 in which a mineral acid is present.

21. The process of converting maleic acid to fumaric acid which comprises heating an aqueous solution containing maleic acid with any of the formamidine disulfides and their salts.

22. The process of converting maleic acid to fumaric acid which comprises heating an aqueous solution containing maleic acid with a formamidine disulfide selected from the group consisting of formamidine disulfide, N-phenyl formamidine disulfide, ethylene formamidine disulfide, diethyl formamidine disulfide, allyl formamidine disulfide, and their salts.

23. The process of claim 22 in which the aqueous solution is a waste liquor.

24. The process of claim 23 carried out in the presence of a chemically inert decolorizing agent, the waste liquor being colored.

References Cited in the file of this patent

UNITED STATES PATENTS

| 1,401,937 | Bailey | Dec. 27, 1920 |
| 2,414,066 | Scott | Jan. 7, 1947 |
| 2,454,385 | Howland et al. | Nov. 23, 1948 |
| 2,483,576 | De Vegvar | Oct. 4, 1949 |